United States Patent Office 2,949,466
Patented Aug. 16, 1960

2,949,466

PYRIMIDINE COMPOUNDS AND MEANS OF PRODUCING THE SAME

Milton L. Hoefle, Grosse Pointe Woods, and Robert F. Meyer, St. Clair Shores, Mich., assignors to Parke, Davis & Company, Detroit, Mich., a corporation of Michigan No Drawing. Filed Mar. 4, 1958, Ser. No. 718,984

6 Claims. (Cl. 260—256.4)

This invention relates to organic chemical compounds having a pyrimidine nucleus and to methods of obtaining the same. More particularly, the invention relates to a new class of pyrimido[4,5-d]pyrimidines, and acid-addition salts thereof. These compounds in free base form have the formula,

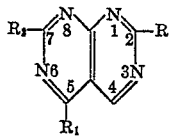

where R represents hydrogen or an amino, mono(lower)-alkylamino, di(lower)alkylamino, benzylamino or halobenzylamino radical; $R_1$ represents an amino, mono(lower)alkylamino, benzylamino or hydroxyl radical; and $R_2$ represents hydrogen or an amino or mono(lower)alkylamino radical.

Pyrimido[4,5-d]pyrimidine compounds of this invention are produced by reacting a 4-aminopyrimidine having the formula

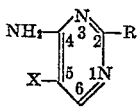

with a carbonyl or carbonyl-related compound such as a urea, guanidine, amidine, carboxylic acid anhydride, acid halide, amide or ortho carboxylic acid ester; where X represents a cyano, carbamoyl or carbalkoxy group and R has the aforementioned significance. For the case where the radical X of the pyrimidine starting material is a cyano radical the reaction is carried out with an amide such as formamide or with a guanidine or amidine. Where X is a carbamoyl radical the reaction is carried out with a urea, a carboxylic acid anhydride, acid halide, amide or an ortho carboxylic acid ester; and where X is a carbalkoxy radical the reaction is carried out with an amide or a urea. In general, the reaction can be carried out in the absence of solvent but in the case of reaction with a guanidine or an amidine a non-reactive organic solvent such as alcohol or 2-ethoxyethanol is employed. The reaction temperature is not particularly critical; for best results the process is carried out at the reflux temperature of the reaction mixture. The preferred range of temperature for the reaction with formamide is from 130° C. to about 210° C. The preferred temperature in the reaction with urea is about 200° C.; the preferred temperature range in the case of a guanidine or amidine is from 80 to 130° C. In general, the proportion of the reactants can be varied widely. Preferably, the carbonyl compound is employed in substantial excess of equimolar quantity since it serves in most cases as a useful solvent. In the reaction with a guanidine or amidine a substantially equivalent quantity is employed.

In another embodiment of the invention the 2-substituted pyrimido[4,5-d]pyrimidine-5-thiols having the formula

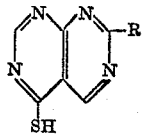

are prepared by reacting the corresponding pyrimido[4,5-d]pyrimidin-5-ol compounds having the formula

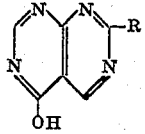

with phosphorus pentasulfide in the presence of a basic solvent such as pyridine where R has the aforementioned significance. At least one equivalent, and preferably an excess of about twenty percent, of phosphorus pentasulfide is employed. The process is conveniently carried out at temperatures in the range from about 80 to 140° C. At lower temperature the reaction time required is unduly long whereas at higher temperature there is an undesirable tendency toward decomposition of the products.

In a further embodiment of the invention, the 2,5-disubstituted pyrimido[4,5-d]pyrimidines having the formula

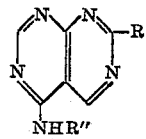

are prepared by reacting the corresponding pyrimido[4,5-d]pyrimidine-5-thiols having the formula

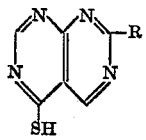

wherein R is defined as before, with an amine having the formula $R''NH_2$. The term $R''$ represents hydrogen or a phenyl, lower alkyl, aralkyl, or heterocyclic-substituted alkyl radical. The reaction is carried out at elevated temperatures, preferably in the range from about 100 to 160° C. In general, more than one molar equivalent of the reacting amine is employed. In the reaction where R represents an —S(lower alkyl) radical, best results are obtained when only two molar equivalents of the reacting amine is employed. However, in other cases a larger excess of the amine, e.g. up to six equivalents, is ordinarily employed since it serves as a convenient solvent. If desired, one can employ other solvents also such as water, alcohol, 2-ethoxyethanol and the like.

In a still further embodiment of this invention, 2-alkylthio derivatives having the structural formula

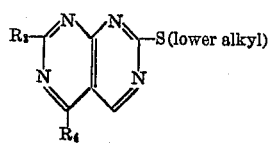

wherein $R_3$ represents hydrogen, or an amino or lower alkylthio radical and $R_4$ represents —OH, —NH$_2$, —NH(lower alkyl), —NH(aralkyl) or anilino, are reacted with an amine having the formula $R''NH_2$ in which $R''$ has the meaning assigned to it previously. The reaction is carried out at elevated temperature, preferably in the range of about 100 to 140° C. At least one molar equivalent of the amine (R″NH₂) is employed although an excess of this quantity is preferred. No added solvent is required, but one or more of various solvents such as water, alcohol, 2-ethoxyethanol, and the like can be employed. The pyrimido[4,5-d]pyrimidine obtained in this reaction has the structural formula

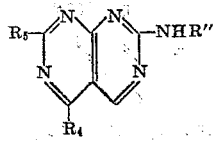

When R₃ represents a lower alkylthio group, R₅ represents NHR″; whereas in all of the other cases given, R₅ is the same as R₃.

In another embodiment of the invention a pyrimidine derivative of the structural formula

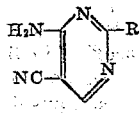

wherein R can represent hydrogen, —NH₂, —NHAcyl, —NH(lower aliphatic), —NH(aralkyl) such as benzylamino, halobenzylamino, etc., —N(lower alkyl)₂, anilino, —S (lower alkyl), or heterocyclic amino such as piperidino, morpholino and pyrrolidino, is heated with formic acid or a trialkylorthoformate such as triethylorthoformate and an amine of the formula R‴NH₂ wherein R‴ represents hydrogen, a lower open-chain aliphatic or cycloaliphatic radical, which can be a hydrocarbon radical or a substituted hydrocarbon radical such as hydroxyhydrocarbon or alkoxyhydrocarbon, an aryl or aralkyl radical which can be either a hydrocarbon radical or a hydrocarbon radical substituted by atoms or groups such as halo, amino, hydroxy or alkoxy, or a heterocyclic-substituted alkyl radical such as piperidinoalkyl or morpholinoalkyl. Products obtained by this process are pyrimido[4,5-d]pyrimidines of the structural formula

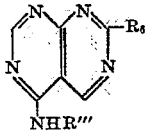

When, in the starting material, R represents a lower alkylthio group, R₆ represents NHR‴; when R represents —NHAcyl, R₆ represents —NH₂; whereas in all of the other cases given, R₆ is the same as R. This process can be carried out by heating the reactants at a temperature of from 160 to 220° C., preferably from 180 to 200° C. The reaction is conveniently accomplished by using an excess of the amine as a solvent; or the formamide derivative HCONHR‴ can be used as a solvent. An inert solvent can also be employed. It is also satisfactory to carry out this process by a series of step-wise reactions such as first reacting the amine R‴NH₂ with formic acid and thereafter adding the nitrile.

The compounds of the invention exhibit pronounced diuretic activity when administered orally and hence have value as diuretic agents. Among the disubstituted compounds of the invention which possess outstanding diuretic activity are 2,5-diaminopyrimido[4,5-d]pyrimidine, 2-amino-5-benzylaminopyrimido[4,5-d]pyrimidine, 2-amino-5-propylaminopyrimido[4,5-d]pyrimidine and 2-amino-5-butylaminopyrimido[4,5-d]pyrimidine; and among the trisubstituted compounds are 5,7-diamino-2-ethylthiopyrimido[4,5-d]pyrimidine, 2-benzylamino-5,7-diaminopyrimido[4,5-d]pyrimidine and 2-amino-5-hydroxy-7-methylpyrimido[4,5-d]pyrimidine. The compounds of the invention are also useful as intermediates for the prdouction of other pyrimido-pyrimidine compounds. In particular, the pyrimido-pyrimidin-ols are useful for the production of the corresponding thiols which in turn are useful for the production of the related amines. Likewise, the alkylthio-substituted pyrimido-pyrimidines of the invention are useful as intermediates for the production of the corresponding amino-substituted pyrimido-pyrimidine compounds. The compounds occur, in some cases, in hydrated form. In the applications of this invention the compounds can be employed as free bases or in the form of non-toxic acid-addition salts formed by admixture with a variety of inorganic and organic acids. Among such acids are hydrochloric, hydrobromic, hydriodic, sulfuric, acetic, benzoic, citric, maleic, malic, gluconic, ascorbic and related acids.

The invention is illustrated by the following examples:

EXAMPLE 1

27 parts of 2,4-diamino-5-cyanopyrimidine are dissolved in 100 parts of formamide and the mixture is heated at reflux temperature for thirty minutes. The reaction mixture is cooled, 100 parts of ethanol are added, and the mixture is filtered and washed with 100 parts of ethanol to remove traces of formamide. The resulting product, 2,5-diaminopyrimido[4,5-d]pyrimidine monohydrate, may be purified by dissolving in 400 parts of 1-normal hydrochloric acid, decolorizing by the addition of 1% of charcoal, filtering and neutralizing the filtrate with concentrated ammonium hydroxide. The resulting solid is collected by filtration, washed successively with 200 parts of water and 100 parts of ethanol and dried in a vacuum oven at 60° C.; M.P. above 300° C. The product has the formula:

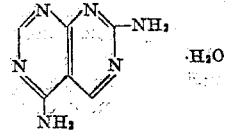

EXAMPLE 2

100 parts of 2,4-diamino-5-cyanopyrimidine are added slowly to 450 parts of concentrated sulfuric acid, with occasional cooling so that the temperature does not exceed 30–40° C. After standing at room temperature for two hours, the solution is poured onto ice, with stirring, and the resultant sulfate of 2,4-diamino-5-pyrimidine-carboxamide is collected by filtration. This product is dissolved in 2000 parts of boiling water and the resulting solution is made basic with concentrated ammonium hydroxide. The mixture is cooled and the product is removed by filtration to yield 2,4-diamino-5-pyrimidine-carboxamide, M.P. 270–272° C. 60 parts of this product are dissolved in 150 parts of formamide and the mixture is heated at 190° C. for one hour with stirring. The mixture is cooled, the product is collected by filtration and washed with 400 parts of water and then 200 parts of ethanol. The dried product is 2-amino-5-hydroxypyrimido[4,5-d]pyrimidine, M.P. above 300° C.

2-amino-5-hydroxypyrimido[4,5-d]pyrimidine can also be obtained by heating 2 parts of 2,4-diamino-5-pyrimidinecarboxamide in a mixture of 10 parts of ethyl orthoformate and 4 parts of acetic anhydride at reflux temperature for one and one-half hours. The resulting reaction mixture is cooled, the crystals removed by filtration and the product washed with ethanol. The filter cake is dissolved in 50 parts of 1-normal sodium hydroxide solution, treated with ½% charcoal, filtered and the filtrate acidified with glacial acetic acid. The white crystalline product which separates is collected and dried. This product is 2-amino-5-hydroxypyrimido[4,5-d]pyrimidine.

The same 2-amino-5-hydroxypyrimido[4,5-d]pyrimidine can also be prepared by heating 10 parts of ethyl 2,4-diaminopyrimidine-5-carboxylate [Am. Chem. J., 38, 598 (1907)] and 20 parts of formamide at 180 to 200° C. for one hour. After the reaction mixture is cooled, the crystalline product is collected on a filter and washed with 50 parts of ethanol.

EXAMPLE 3

A mixture consisting of 20 parts of 2,4-diamino-5-pyrimidinecarboxamide in 200 parts of acetic anhydride is heated at reflux temperature for three hours, cooled and filtered. The filter cake is 2-acetamido-5-hydroxy-7-methylpyrimido[4,5-d]pyrimidine. The acetyl group is removed by dissolving the product in 200 parts of 5% sodium hydroxide solution which is heated to boiling. The solution is treated with ½% charcoal, filtered, and the filtrate made slightly acidic with glacial acetic acid. The resulting precipitate is removed by filtration and washed with 200 parts of water. The yellow product, 2-amino-5-hydroxy-7-methylpyrimido[4,5-d]pyrimidine, may be further purified by recrystallization from acetic acid; M.P. above 310° C.

EXAMPLE 4

5 parts of 2,4-diamino-5-pyrimidinecarboxamide are fused with 10 parts of urea at 200° C. for thirty minutes. The melt is clear and gradually turns white as the product separates out. After cooling, the mass is dissolved in 200 parts of 2-normal sodium hydroxide solution and the desired product is obtained by neutralization with glacial acetic acid. The product is removed by filtration and dried in a vacuum oven at 60° C. The product is 2-amino-5,7-dihydroxypyrimido[4,5-d]pyrimidine monohydrate, M.P. above 300° C.

EXAMPLE 5

A solution of 10 parts of 4-amino-2-(ethylthio)-5-cyanopyrimidine and 25 parts of 25% aqueous methylamine in 40 parts of alcohol is heated in an autoclave at 140° C. for four hours. The mixture is cooled and the resulting precipitate is removed by filtration. This material, which is pale yellow in color, is 4-amino-2-methylamino-5-cyanopyrimidine; M.P. 230–232° C.

A mixture consisting of 3 parts of 4-amino-2-methylamino-5-cyanopyrimidine and 8 parts of formamide is heated at 180–190° C. for two hours. The reaction mixture is cooled and poured into 30 parts of ethanol, and filtered. The filter cake is washed with 60 parts of hot ethanol. This product is then dissolved in 30 parts of 1-normal hydrochloric acid by warming. The acidic solution is treated with ½% charcoal and filtered hot. The filtrate is cooled and filtered to remove the product which is dried. The product is 5-amino-2-methylaminopyrimido[4,5-d]pyrimidine monohydrochloride; M.P. above 300° C.

EXAMPLE 6

12.6 parts of 4-amino-2-methylamino-5-cyanopyrimidine are added to 72 parts of concentrated sulfuric acid in small portions with cooling so that the temperature of the reaction mixture does not exceed 30° C. This solution is allowed to stand at room temperature [20–30° C.] for two hours and then is poured over 150 parts of ice. The resulting white solid sulfate salt is removed by filtration and dissolved in 150 parts of hot water and neutralized. The solution is cooled and the precipitate removed by filtration and dried. This material is 4-amino-2-methylamino-5-pyrimidinecarboxamide; M.P. 268–270° C.

A mixture consisting of 9.6 parts of 4-amino-2-methylamino-5-pyrimidinecarboxamide in 25 parts of formamide is heated at reflux temperature for thirty minutes. The reaction mixture is allowed to cool to 100° C. at which time 50 parts of ethanol is cautiously added. The warm solution is filtered and the filter cake is recrystallized from 300 parts of glacial acetic acid to yield the product, 2-methylamino-5-hydroxypyrimido[4,5-d]pyrimidine; M.P. above 300° C.

EXAMPLE 7

74 parts of allylguanidine hemisulfate are added to a stirred, chilled solution of 300 parts of absolute ethanol containing 30 parts of sodium methoxide. The resulting mixture is stirred for fifteen minutes and then 61 parts of ethoxymethylenemalononitrile are added in portions at 50° C. After this addition, the reaction mixture is heated at reflux temperature for six hours. The reaction mixture is cooled, the solid removed by filtration and washed with water. The filter cake, consisting mainly of 4-amino-2-allylamino-5-cyanopyrimidine, is suspended in 200 parts of water and again filtered to remove any inorganic material.

5 parts of 4-amino-2-allylamino-5-cyanopyrimidine (M.P. 175–177° C.) are added in portions to 18 parts of concentrated sulfuric acid at 50° C. The resulting mixture is warmed at 50° C. for three hours and then poured over ice. The resulting solution is made basic with ammonium hydroxide, filtered and the filter cake washed with water. The filter cake, consisting mainly of 4-amino-2-allylamino-5-pyrimidinecarboxamide, is recrystallized from aqueous isopropanol; M.P. 222–223° C.

A mixture consisting of 2.8 parts of 4-amino-2-allylamino-5-pyrimidinecarboxamide in 7 parts of formamide is heated at 200° C. for twenty minutes. The mixture is cooled, diluted with 20 parts of water and filtered. The product, 2-allylamino-5-hydroxypyrimido[4,5-d]pyrimidine, may be purified if desired by recrystallization from water; M.P. 278–280° C.

EXAMPLE 8

A solution of 20 parts of 4-amino-2-(ethylthio)-5-cyanopyrimidine, 50 parts of aniline and 0.5 part of concentrated hydrochloric acid is heated at 150° C. for one hour and then 175° C. for two hours. The resulting mixture is cooled, diluted with 200 parts of ethanol and the precipitate is removed by filtration. The filter cake, consisting of 4-amino-2-anilino-5-cyanopyrimidine, is washed successively with 100 parts of 1-normal acetic acid and 200 parts of ethanol, and is dried.

19.2 parts of 4-amino-2-anilino-5-cyanopyrimidine (M.P. 232–233° C.) are added portion-wise to 125 parts of concentrated sulfuric acid with occasional cooling so that the temperature does not exceed 30° C. The resulting solution is allowed to stand at 20–23° C. for two hours and then poured over ice. The resultant pale yellow solid is removed by filtration, dissolved in 500 parts of boiling water and decolorized with charcoal. The filtrate is neutralized with concentrated ammonium hydroxide, and the resulting precipitate, consisting of 4-amino-2-anilino-5-pyrimidinecarboxamide, is removed by filtration and dried; M.P. 246–247° C.

A mixture consisting of 10 parts of 4-amino-2-anilino-5-pyrimidinecarboxamide and 20 parts of formamide is heated at reflux temperature for forty-five minutes. The mixture is cooled and filtered and the filter cake, consisting of 2-anilino-5-hydroxypyrimido[4,-d]pyrimidine, is washed with 100 parts of hot ethanol. The product may be purified by dissolving in 5% sodium hydroxide solution, treating with charcoal, filtering, neutralizing the filtrate with glacial acetic acid, and collecting and recrystallizing the precipitate from glacial acetic acid.

EXAMPLE 9

27.2 parts of 1,1-dimethylguanidine sulfate are added to a solution consisting of 200 parts of absolute ethanol containing 10.8 parts of sodium methoxide. The reaction mixture is allowed to stand at 15–20° C. for thirty minutes and then 24 parts of ethoxymethylenemalononitrile are added in six equal portions. The reaction mixture is stirred at room temperature for one hour and then heated at reflux temperature for three hours. After cooling, the solids, consisting mainly of 4-amino-2-dimethylamino-5-cyanopyrimidine, are removed by filtration and suspended in 100 parts of warm water and dried at 60° C. in a vacuum oven.

A mixture consisting of 10 parts of 4-amino-2-dimethylamino-5-cyanopyrimidine (M.P. 234–236° C.) and 20 parts of formamide is heated at 180–190° C. for four hours. The reaction mixture is allowed to cool below 100° C., 70 parts of ethanol are added, the warm mixture is filtered and the filter cake washed with 70 parts of ethanol. The product, 5-amino-2-dimethylaminopyrimido[4,5-d]pyrimidine, is purified by dissolving in 50 parts of 2-normal hydrochloric acid at 70° C., treating with charcoal, filtering, cooling and again filtering; the resulting monohydrochloride monohydrate melts or decomposes above 300° C.

EXAMPLE 10

10 parts of 4-amino-2-dimethylamino-5-cyanopyrimidine are added portion-wise to 60 parts of concentrated sulfuric acid with occasional cooling so that the reaction temperature does not exceed 35° C. After standing at room temperature for two hours, the solution is poured into 150 parts of ice, the product is removed by filtration and washed with 20 parts of ice water. This product, consisting of 4-amino-2-dimethylamino-5-pyrimidinecarboxamide sulfate, is converted to the free base by dissolving in 150 parts of hot water, neutralizing with concentrated ammonium hydroxide, collecting and recrystallizing the resulting precipitate from boiling water; M.P. 289–290° C.

A mixture consisting of 4.5 parts of 4-amino-2-dimethylamino-5-pyrimidinecarboxamide and 12 parts of formamide is heated at 185–190° C. for two hours. The mixture is cooled and the product, 2-dimethylamino-5-hydroxypyrimido[4,5-d]pyrimidine, is removed by filtration and washed with 100 parts of hot ethanol. The product can be purified by dissolving in 50 parts of 2-normal sodium hydroxide solution, treating with charcoal, filterng, neutralizing the filtrate with glacial acetic acid, and collecting as a fine white crystalline precipitate; M.P. above 300° C.

EXAMPLE 11

A mixture consisting of 10 parts of 4-amino-2-(ethylthio)-5-cyanopyrimidine and 25 parts of piperidine in 40 parts of ethanol is heated in an autoclave at 140° C. for four hours. After cooling, the reaction product, 4-amino-2-piperidino-5-cyanopyrimidine, is removed by filtration and dried.

A mixture consisting of 23 parts of 4-amino-2-piperidino-5-cyanopyrimidine (M.P. 212–214° C.) and 50 parts of formamide is heated at 180–185° C. for five hours. The reaction mixture is cooled and the product, 5-amino-2-piperidinopyrimido[4,5-d]pyrimidine, is removed by filtration and washed with 200 parts of hot ethanol. The product can be purified by dissolving in 100 parts of 2-normal hydrochloric acid, treating with charcoal, filtering and reprecipitating by the addition of concentrated ammonium hydroxide until the solution is alkaline. The product is removed by filtration and dried; M.P. above 300° C.

EXAMPLE 12

A mixture consisting of 5.5 parts of 4-amino-5-cyanopyrimidine and 15 parts of formamide is heated at 190° C. for thirty minutes and then cooled. The product, 5-aminopyrimido[4,5-d]pyrimidine, is removed by filtration and washed with isopropanol; M.P. above 310° C.

EXAMPLE 13

To a chilled alcoholic solution of guanidine (prepared from 30 parts of guanidine hydrochloride and 200 parts of ethanol in which is dissolved 16.8 parts of sodium methoxide) are added drop-wise 38.5 parts of ethyl 2 - (ethylthio) - 4 - chloropyrimidine - 5 - carboxylate [Wheeler and Johnson, Am. Chem. J., 38, 597 (1907)]. The reaction mixture is stirred at room temperature for two hours, and it is then concentrated under reduced pressure. The residue is added to 150 parts of warm water and an insoluble neutral fraction is removed by filtration. The filtrate is neutralized with glacial acetic acid and the resulting product is collected by filtration, washed with 50 parts of cold water and dried in a vacuum oven at 60°. The product is 7-amino-5-hydroxy-2-(ethylthio)-pyrimido[4,5-d]pyrimidine; M.P. over 300° C.

EXAMPLE 14

Five parts of 7-amino-5-hydroxy-2-(ethylthio)-pyrimido[4,5-d]pyrimidine are dissolved in 50 parts of 10% aqueous methylamine, and the solution is heated in an autoclave for four hours at 140° C. After cooling, the autoclave is opened and the white product is removed by filtration, washed with 50 parts of cold water and dried in a vacuum at 60° C. The product is 7-amino-2-methylamino-5-hydroxypyrimido[4,5-d]pyrimidine; M.P. over 300° C.

EXAMPLE 15

66 parts of ethyl isothiouronium bromide [HN=C(SC$_2$H$_5$)—NH$_2$·H Br] are added at 10–15° C. to a solution of 20 parts of sodium methoxide in 300 parts of absolute ethanol. Then 43 parts of ethyl 2-(ethylthio)-4-chloropyrimidine-5-carboxylate are added dropwise with stirring and cooling. The reaction mixture is stirred for two hours at room temperature, and then for one hour at reflux. The mixture is concentrated under reduced pressure and 150 parts of warm water are added. An insoluble oil is removed, and the basic solution is neutralized with glacial acetic acid. The product, 5-hydroxy-2,7-bis(ethylthio)-pyrimido[4,5-d]pyrimidine, is collected by filtration and purified by recrystallization from alcohol; M.P. 221–222° C.

A solution of 5 parts of 5-hydroxy-2,7-bis-(ethylthio) pyrimido[4,5-d]pyrimidine in 50 parts of 16% alcoholic ethylamine is heated in an autoclave at 140–145° C. for four hours. After cooling the autoclave is opened and the contents concentrated under reduced pressure. The solid residue is dissolved in 50 parts 2 N sodium hydroxide and neutralized with acetic acid. The product is collected by filtration and suspended in 200 parts of refluxing ethanol and filtered hot. The product is 2,7-bis(ethylamino)-5-hydroxypyrimido[4,5-d]pyrimidine; M.P. over 300° C.

EXAMPLE 16

A solution of 18 parts of 4-amino-2-(ethylthio)-5-cyanopyrimidine and 22 parts of benzylamine is heated at 135–140° C. for six hours. After cooling, the product, 4-amino-2-benzylamino-5-cyanopyrimidine, is recrystalized from ethanol; M.P. 176–178° C.

A solution of 5 parts of 4-amino-2-benzylamino-5-cyanopyrimidine and 10 parts of formamide is heated at 180° C. for four hours. After cooling 50 parts of ethanol are added and the product is collected by filtration. The product, 5-amino-2-benzylaminopyrimido[4,5-d]pyrimidine, can be purified by recrystallization from ethanol; M.P. 285–287° C.

EXAMPLE 17

10.0 parts of 4-amino-2-benzylamino-5-cyanopyrimidine are added to 72 parts of concentrated sulfuric acid in small portions with cooling so that the temperature of the reaction mixture does not exceed 35° C. This solution is allowed to stand at room temperature (20–23° C.) for two hours and is then poured over 200 parts of ice. The supernatant liquid is removed from the viscous product by decantation. The viscous sulfate salt is dissolved in 150 parts of hot water, and a small amount of insoluble material is removed by filtration. The filtrate is neutralized and the white product is collected by filtration and dried. The product is 4-amino-2-benzylamino-5-pyrimidinecarboxamide; M.P. 176–178° C.

A solution of 5 parts of 4-amino-2-benzylamino-5-pyrimidinecarboxamide in 10 parts of formamide is heated at reflux temperature for forty-five minutes. The reaction mixture is allowed to cool to about 100° C. at which time 100 parts of ethanol are cautiously added.

The warm mixture is filtered and the tan product is purified by dissolving in 100 parts of 2 N sodium hydroxide solution, treating with decolorizing charcoal and neutralizing with glacial acetic acid. The white product is collected by filtration and dried in a vacuum oven at 60° C. and may be further purified by recrystallization from glacial acetic acid. The product is 2-benzylamino-5-hydroxypyrimido[4,5-d]pyrimidine; M.P. 294–295° C.

The corresponding 2-(o-chloro)benzylamino-5-hydroxypyrimido[4,5-d]pyrimidine from 4-amino-2-(o-chloro)-benzylamino-5-cyanopyrimidine is prepared in an analogous manner [M.P. 290° C.].

EXAMPLE 18

4.8 parts of 2-benzylamino-5-hydroxyprimido[4,5-d]pyrimidine are added to 50 parts of pyridine containing 4.5 parts of phosphorus pentasulfide. The resulting mixture is heated at reflux for three hours, during which time the reactants go into solution. The solution is cooled and the product, 2-benzylaminopyrimido[4,5-d]pyrimidine5-thiol, is removed by filtration and purified by recrystallization from glacial acetic acid; M.P. 301–302° C.

3.7 parts of 2-benzylaminopyrimido[4,5-d]pyrimidine-5-thiol are added to 40 parts of alcohol saturated with ammnoia and the reaction is heated in an autoclave at 140–145° C. for four hours. After cooling the autoclave is opened and the solid is removed by filtration. The product, 5-amino-2-benzylaminopyrimido[4,5-d]pyrimidine, is identical in all aspects with the product disclosed in Example 16.

EXAMPLE 19

100 parts of 4-amino-2-(ethylthio)-5-pyrimidine-carboxamide [Am. Chem. J., 40, 242 (1908)] are heated at reflux for three hours in 500 parts of triethylorthoformate, and the alcohol which is formed during the course of the reaction is removed by distillation. The reaction mixture is cooled and the product is collected by filtration, washed with 500 parts of ether, and dried in a vacuum oven at 60° C. The yellow product is 5-hydroxy-2-(ethylthio)-pyrimido[4,5-d]pyrimidine.

A mixture of 100 parts of 5-hydroxy-2-(ethylthio)-pyrimido[4,5-d]pyrimidine, 110 parts of phosphorus pentasulfide and 500 parts of pyridine is heated at reflux with stirring for three hours. After cooling, the excess solvent is removed under reduced pressure, and the residue is suspended in 1000 parts of cold 5 percent aqueous sodium hydroxide solution. This mixture is filtered, and the filtrate is treated with 10 parts of decolorizing charcoal and then neutralized with glacial acetic acid. The golden yellow product is collected by filtration, washed with 200 parts of water and dried in a vacuum oven at 60° C. The product is 2-(ethylthio)pyrimido[4,5-d]pyrimidine-5-thiol; M.P. 280–285° C.

12.5 parts of 2-(ethylthio)pyrimido[4,5-d]pyrimidine-5-thiol are dissolved in 300 parts of water containing 14 parts of 25 percent aqueous methylamine. The solution is refluxed for twenty minutes. The reaction mixture is cooled and the product, 2-(ethylthio)-5-methylaminopyrimido[4,5-d]pyrimidine, is collected by filtration and washed with water. After recrystallization from isopropanol, the product melts at 280° C.

A solution of 1 part of 2-(ethylthio)-5-methylaminopyrimido[4,5-d]pyrimidine and 30 parts of alcohol saturated with ammonia is heated in an autoclave at 135° C. for five hours. After cooling, the autoclave is opened and the product is collected by filtration. This product is 2-amino-5-methylaminopyrimido[4,5-d]pyrimidine; M.P. above 300° C.

EXAMPLE 20

A mixture of 11.2 parts of 2-(ethylthio)pyrimido-[4,5-d]pyrimidine-5-thiol, 400 parts of water, 400 parts of methanol and 11 parts of benzylamine is concentrated by boiling off the excess solvent until only about 300 parts remain. After cooling the product, 2-(ethylthio)-5-benzylaminopyrimido[4,5-d]pyrimidine, is collected by filtration; M.P. 231–232° C.

4 parts of 2-(ethylthio)-5-benzylaminopyrimido[4,5-d]pyrimidine are heated in an autoclave with 40 parts of saturated alcoholic ammonia at 150° C. for five hours. After cooling the product is collected by filtration and is purified by recrystallizing from ethanol. The product is 2-amino-5-benzylaminopyrimido[4,5-d]pyrimidine; M.P. 320° C.

EXAMPLE 21

A mixture of 11.2 parts of 2-(ethylthio)pyrimido[4,5-d]pyrimidine-5-thiol, 18 parts furfurylamine, 200 parts of water and 400 parts of ethanol is concentrated by boiling to about one-half of the original volume. The mixture is chilled and the product is collected by filtration, washed with 50 parts ethanol and dried in a vacuum oven at 60° C. The product is 2-(ethylthio)-5-furfurylaminopyrimido[4,5-d]pyrimidine; M.P. 219–220° C.

EXAMPLE 22

A solution of 5.6 parts of 2-(ethylthio)pyrimido[4,5-d]-pyrimidine-5-thiol in 20 parts of aniline is heated at reflux for thirty minutes. The reaction mixture is cooled and the product crystallized from 200 parts of isopropanol. The crystalline product is 2-(ethylthio)-5-anilinopyrimido[4,5-d]pyrimidine; M.P. 250–255° C.

EXAMPLE 23

9.6 parts of guanidine hydrochloride are added to a solution of 5.4 parts of sodium methoxide in 200 parts of absolute ethanol. Then 18 parts of 4-amino-2-(ethylthio)-5-cyanopyrimidine are added and the reaction mixture is stirred at reflux for eighteen hours. After cooling the product is collected by filtration, and is purified by dissolving in 200 parts of hot 2 N hydrochloric acid, treating with decolorizing charcoal and neutralizing with ammonium hydroxide. The product is collected by filtration, washed with 50 parts of water and dried in a vacuum oven at 60° C. The product, 5,7-diamino-2-(ethylthio)-pyrimido[4,5-d]pyrimidine, may be further purified by recrystallization from 2-ethoxyethanol; M.P. above 300° C.

In the above example, guanidine hydrochloride may be replaced by 12.2 parts of methylguanidine sulfate or 13.6 parts of 1,1-dimethylguanidine sulfate; the same product, 5,7-diamino-2-(ethylthio)pyrimido[4,5-d]pyrimidine, is obtained in either case.

A mixture of 5 parts of 5,7-diamino-2-(ethylthio)-pyrimido[4,5-d]pyrimidine, 20 parts of 25 percent aqueous methylamine and 50 parts of 2-ethoxyethanol is heated at 140° C. for four hours in an autoclave. The reaction mixture is cooled and the product, 5,7-diamino-2-methylaminopyrimido[4,5-d]pyrimidine, is collected by filtration. The product can be purified by suspending in 200 parts of refluxing 2-ethoxyethanol and filtering the suspension while hot; M.P. above 300° C.

EXAMPLE 24

9.6 parts of guanidine hydrochloride are added to a solution of 5.6 parts of sodium methoxide in 200 parts of 2-ethoxyethanol. Then 13.5 parts of 2,4-diamino-5-cyanopyrimidine are added and the reaction mixture is heated at reflux for twenty hours and filtered while hot. The product, 2,5,7-triaminopyrimido[4,5-d]pyrimidine, can be purified by dissolving in 600 parts of boiling water containing 20 parts of concentrated hydrochloric acid, treating with decolorizing charcoal and filtering. The product in monohydrochloride monohydrate form separates from the filtrate on cooling; M.P. above 300° C.

In like manner, the following diaminopyrimido-pyrimidines can be prepared starting with guanidine hydrochloride, sodium methoxide, 2-ethoxyethanol and the following amino-cyanopyrimidine compounds:

| | | |
|---|---|---|
| 4-amino-2-anilino-5-cyanopyrimidine. | 5,7-diamino-2-anilino-pyrimido[4,5-d]pyrimidine. | M.P., above 300° C. |
| 4-amino-2-piperidino-5-cyanopyrimidine. | 5,7-diamino-2-piperidino-pyrimido[4,5-d]pyrimidine. | Do. |
| 4-amino-2-benzylamino-5-cyanopyrimidine. | 5,7-diamino-2-benzyl-aminopyrimido[4,5-d]pyrimidine. | M.P., 294-295° C. |
| 4-amino-2-dimethyl-amino-5-cyanopyrimidine. | 5,7-diamino-2-dimethyl-amino-pyrimido[4,5-d]pyrimidine. | M.P., above 300° C. |

EXAMPLE 25

9.5 parts of acetamidine hydrochloride are added to a solution of 5.4 parts of sodium methoxide in 200 parts of anhydrous ethanol; 18 parts of 4-amino-2-(ethylthio)-5-cyanopyrimidine are added and the reaction mixture is stirred at reflux for twenty-four hours and filtered while hot. The product, 5-amino-7-methyl-2-(ethylthio)pyrimido[4,5-d]pyrimidine, is purified by slurrying in 300 parts of hot water and filtering to remove the inorganic salts present. The product may be further purified by recrystallization from 2-ethoxyethanol; M.P. 279–280° C.

EXAMPLE 26

20.0 parts of 4-amino-2-benzylamino-5-pyrimidine-carboxamide and 20 parts of acetic anhydride are heated at reflux for three hours. The excess solvent is removed by distillation under reduced pressure, and the residue is dissolved in 700 parts of 2 percent sodium hydroxide solution, treated with decolorizing charcoal, and heated at the boiling point for five minutes to hydrolyze any acylamino groups. The solution is neutralized with glacial acetic acid to yield the product, 2-benzylamino-5-hydroxy-7-methylpyrimido[4,5-d]pyrimidine, which is recrystallized from glacial acetic acid; M.P. above 300° C.

In like manner, the following 5-hydroxy-7-alkylpyrimidopyrimidines can be prepared starting with the following acid anhydrides and 4-amino-5-pyrimidine carboxamides:

| | | | |
|---|---|---|---|
| acetic anhydride | 4-amino-2-dimethylamino-5-pyrimidine carboxamide. | 2-dimethylamino-5-hydroxy-7-methylpyrimido-[4,5-d]pyrimidine. | M.P., 275–276° C. |
| Do | 4-amino-2-anilino-5-pyrimidine carboxamide. | 2-anilino-5-hydroxy-7-methyl-pyrimido[4,5-d]pyrimidine. | M.P., above 300° C. |
| propionic anhydride | 2,4-diamino-5-pyrimidine carboxamide. | 2-amino-5-hydroxy-7-ethylpyrimido[4,5-d]pyrimidine. | M.P., above 330° C. |
| butyric anhydride | do | 2-amino-5-hydroxy-7-n-propyl-pyrimido-[4,5-d]pyrimidine. | M.P., 315° C. |

EXAMPLE 27

A mixture of 22.4 parts of 2-(ethylthio)-pyrimido[4,5-d]pyrimidine-5-thiol, 400 parts of water, 400 parts of methanol and 15.0 parts of butylamine is concentrated by heating in an open reaction vessel to about one-third of its original volume. The reaction mixture is chilled and the crude 2-(ethylthio)-5-butylaminopyrimido[4,5-d]pyrimidine is collected and washed with aqueous alcohol. 4 parts of this product are heated in an autoclave for five hours at about 150° C. with 40 parts of saturated alcoholic ammonia. The solid product obtained by concentration and chilling of the reaction mixture is collected on a filter and purified by recrystallization from alcohol. This compound is 2-amino-5-butylaminopyrimido[4,5-d]pyrimidine melting at about 295°–300° C.

By the foregoing procedure, with the substitution of 12.0 parts of propylamine for the butylamine followed by reaction of the resulting 2-(ethylthio)-5-propylamino-pyrimido[4,5-d]pyrimidine with ammonia, the compound obtained is 2-amino-5-propylaminopyramido[4,5-d]pyrimidine; M.P. about 305–307° C.

EXAMPLE 28

A mixture of 50 parts of 2,4-diamino-5-cyanopyrimidine, 500 parts of benzylamine and 76 parts of formic acid (98%) is heated to about 190° C. for three hours and then cooled to room temperature. The crystalline product is collected on a filter, washed well with alcohol and dried in a vacuum at about 60° C. This product is 2-amino-5-benzylaminopyrimido[4,5-d]pyrimidine melting at about 320° C., and is identical with the product of Example 20.

The same compound is also obtained in the following manner. A mixture of 6.75 parts of 2,4-diamino-5-cyanopyrimidine, 30 parts of triethylorthoformate and 100 parts of benzylamine is heated under an efficient distillation column, with continuous removal of the alcohol formed in the reaction as a distillate. Heating is continued until the temperature reaches about 210° C. The mixture is then cooled and the 2-amino-5-benzylaminopyrimido[4,5-d]pyrimidine is collected on a filter, washed with alcohol and dried.

EXAMPLE 29

2-(ethylthio)-4-amino-5-cyanopyrimidine (20 parts) is heated with 150 parts of benzylamine for 30 minutes at about 180° C. Formic acid (30 parts) is added to the cooled mixture, and heating is then continued for an additional three hours at about 190° C. The solid product is collected by filtration of the cooled reaction mixture, following which it is washed with alcohol and dried. If further purification is desired, the crude product is recrystallized from alcohol. This compound melts at about 295° C. and is 2,5-bis(benzylamino)pyrimido[4,5-d]pyrimidine.

EXAMPLE 30

A mixture of propylammonium formate is prepared by the careful addition, with external cooling, of 118 parts of propylamine to 92 parts of 98% formic acid. 2,4-diamino-5-cyanopyrimidine (20 parts) is added and the reaction mixture is heated for two hours at about 190° C., during which time a continuous stream of propylamine vapor is introduced into the reaction vessel. The mixture is then cooled, and the solid product is collected on a filter, washed with alcohol and dried. By recrystallization from aqueous alcohol, this compound, 2-amino-5-propylamino-pyrimido[4,5-d]pyrimidine, is obtained as pale yellow needles melting at about 305–307° C.

EXAMPLE 31

With external cooling, 146 parts of butylamine is gradually added to 92 parts of 98% formic acid. There is then added 20 parts of 2,4-diamino-5-cyanopyrimidine and the mixture is heated for 2 hours at about 190° C. During this time, a continuous stream of butylamine vapor is bubbled through the mixture. After cooling, the solid reaction product is collected on a filter, washed with alcohol and dried. This compound is 2-amino-5-butylaminopyrimido[4,5-d]pyrimidine which after recrystallization from aqueous alcohol melts at about 295–300° C.

EXAMPLE 32

A mixture of 20 parts of 2,4-diamino-5-cyano-pyrimidine, 50 parts of triethylorthoformate and 130 parts of N-(2-aminoethyl)morpholine is heated under an efficient distillation column. As the reaction proceeds, alcohol is continuously removed as a distillate at the top of the column. When the reaction temperature reaches about 210° C., the mixture is cooled and the solid product is collected on a filter, washed with alcohol and dried. The compound obtained can be recrystallized from water. It is 2-amino-5-(morpholino-ethylamino)pyrimido[4,5-d]pyrimidine which melts at about 305° C. after prior discoloration from about 270° C.

EXAMPLE 33

In the same manner as described in Examples 28–32, by reacting a pyrimidine of the structural formula

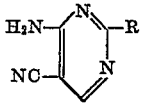

with an amine ($R_1H$) and formic acid or a trialkylorthoformate, there are obtained pyrimido[4,5-d]pyrimidines which correspond to the following formula and are described more fully in Table I.

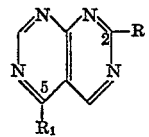

In carrying out this process, it is preferred to use formic acid as a reactant when the amine ($R_1H$) is ammonia or a volatile amine; when a non-volatile or polyfunctional amine is employed as a reactant, it is advantageous to use an excess of the amine as a solvent and to conduct the reaction with triethylorthoformate.

Table I

| $R_1$, Substituent at Position 5 | R, Substituent at Position 2 | Melting Point, °C. |
|---|---|---|
| Amino | Amino | Above 330 |
| Methylamino | do | Above 330 |
| Do | Methylamino | Above 330 |
| Ethylamino | Amino | 320 |
| Allylamino | do | 305 |
| Hexylamino | do | About 300 |
| Cyclohexylmethylamino | do | Above 300 |
| Decylamino | do | 270–280 |
| 3-[2'-(methoxy)ethoxy]Propylamino | do | 237–240 |
| 2-Hydroxyethylamino | do | 305–307 |
| 3-Morpholinopropylamino | do | 277–278 |
| 3-Phenylpropylamino | do | 281–283 |
| 3-Anilinopropylamino | do | 248–250 |
| Phenethylamino | do | About 320 |
| ortho-Methoxyphenethylamino | do | 295 |
| Benzylamino | Pyrrolidino | 315–320 |
| 3-Pyridylmethylamino | Amino | Above 330 |
| para-Chlorobenzylamino | do | 315–320 |
| para-Diethylaminobenzylamino | do | 258–288 |
| para-Methoxybenzylamino | do | About 315 |
| ortho-Methoxybenzylamino | do | 300–305 |
| 3,4-Dimethoxybenzylamino | do | About 300 |
| 2,4-Dimethoxybenzylamino | do | About 300 |

This is a continuation-in-part of our copending application Serial No. 651,830, filed April 10, 1957.

What is claimed is:

1. A pyrimido[4,5-d]pyrimidine of the formula

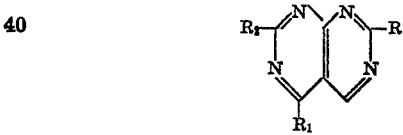

2. 2-amino-5-propylaminopyrimido[4,5-d]pyrimidine.
3. 2-amino-5-benzylaminopyrimido[4,5-d]pyrimidine.
4. 2,5-diaminopyrimido[4,5-d]pyrimidine.
5. 2 - benzylamino - 5,7 - diaminopyrimido[4,5-d]-pyrimidine.
6. A member of the class consisting of pyrimido [4,5-d] pyrimidines of the formula and non-toxic acid-addition salts thereof; wherein R is a member of the class consisting of hydrogen and amino, mono(lower)alkylamino, di(lower)alkylamino, benzylamino and halobenzylamino radicals; $R_1$ is a member of the class consisting of amino, mono(lower)alkylamino, benzylamino, and hydroxyl radicals; and $R_2$ is a member of the class consisting of hydrogen and amino and mono(lower)alkylamino radicals.

References Cited in the file of this patent

FOREIGN PATENTS 186,244   Austria _____ July 25, 1956